United States Patent
Jia et al.

(10) Patent No.: US 10,656,764 B2
(45) Date of Patent: May 19, 2020

(54) TOUCH DEVICE AND DISPLAY DEVICE

(71) Applicant: BOE Technology Group Co., Ltd., Beijing (CN)

(72) Inventors: Yanan Jia, Beijing (CN); Xue Dong, Beijing (CN); Haisheng Wang, Beijing (CN); Chun-Wei Wu, Beijing (CN); Yingming Liu, Beijing (CN); Rui Xu, Beijing (CN); Lijun Zhao, Beijing (CN); Changfeng Li, Beijing (CN); Yunke Qin, Beijing (CN); Yuzhen Guo, Beijing (CN); Pinchao Gu, Beijing (CN); Yanling Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/959,731

(22) Filed: Apr. 23, 2018

(65) Prior Publication Data

US 2018/0239455 A1 Aug. 23, 2018

Related U.S. Application Data

(63) Continuation-in-part of application No. PCT/CN2017/101699, filed on Sep. 14, 2017.

(30) Foreign Application Priority Data

Feb. 23, 2017 (CN) .......................... 2017 1 0099959

(51) Int. Cl.
*G06F 3/042* (2006.01)
*G06K 9/00* (2006.01)
*G06F 3/041* (2006.01)

(52) U.S. Cl.
CPC ............ *G06F 3/042* (2013.01); *G06F 3/0412* (2013.01); *G06K 9/0004* (2013.01); *G06K 9/00013* (2013.01)

(58) Field of Classification Search
CPC ............... G06K 9/0002; G06K 9/0004; G06K 9/00892; G06K 9/00013;
(Continued)

(56) References Cited

U.S. PATENT DOCUMENTS

| 4,740,781 A * | 4/1988 | Brown .................. G06F 3/0412 341/33 |
| 6,688,186 B2 * | 2/2004 | Chae .................... G06K 9/0004 257/E27.111 |

(Continued)

FOREIGN PATENT DOCUMENTS

| CN | 105550664 A | 5/2016 |
| CN | 105631438 A | 6/2016 |

(Continued)

OTHER PUBLICATIONS

Machine translation of TW105122567.*
(Continued)

*Primary Examiner* — Christopher E Leiby
(74) *Attorney, Agent, or Firm* — Arent Fox LLP; Michael Fainberg

(57) ABSTRACT

Disclosed are a touch device and a display device, where the touch device includes: an array substrate, a plurality of sensing elements arranged on the array substrate to recognize a fingerprint, and a plurality of filter structures arranged on a side of the plurality of sensing elements; the side is away from the array substrate: each of the plurality of filter structures comprises a plurality of filter layers arranged in a stack, each of the plurality of filter layers comprises light-transmitting areas and light-shielding areas on a periphery of (Continued)

the light-transmitting areas, orthographic projections of any two of the light-transmitting areas of the plurality of filter layers onto the array substrate have an overlapping area; the overlapping area is smaller than an area of an orthographic projection of any one of the light-transmitting areas of the plurality of filter layers onto the array substrate.

20 Claims, 9 Drawing Sheets

(58) Field of Classification Search
CPC .......... G06K 2009/00939; G06F 3/044; G06F 3/0412; G06F 3/042
See application file for complete search history.

(56) References Cited

U.S. PATENT DOCUMENTS

| | | | | |
|---|---|---|---|---|
| 7,151,532 B2* | 12/2006 | Schulz | ................ | C03C 17/3417 345/173 |
| 2011/0193822 A1* | 8/2011 | Castagner | ............. | G06F 3/0412 345/175 |
| 2015/0021627 A1* | 1/2015 | Fujita | .................... | H01L 33/005 257/82 |
| 2016/0103531 A1* | 4/2016 | Kimura | ............... | G02F 1/13338 345/174 |
| 2016/0132712 A1 | 5/2016 | Yang et al. | | |
| 2016/0224819 A1* | 8/2016 | Kim | ...................... | G06K 9/0004 |
| 2016/0266695 A1* | 9/2016 | Bae | ....................... | G06F 1/1643 |
| 2017/0017824 A1* | 1/2017 | Smith | .................... | G02B 5/005 |
| 2018/0247100 A1* | 8/2018 | Zhu | ....................... | G06K 9/0004 |
| 2018/0268190 A1* | 9/2018 | Chung | ............... | G06K 9/00013 |
| 2018/0307343 A1* | 10/2018 | Xie | ........................ | G06F 3/0416 |
| 2019/0129541 A1* | 5/2019 | Kwon | ..................... | G06F 3/044 |

FOREIGN PATENT DOCUMENTS

| | | | |
|---|---|---|---|
| CN | 106355160 | A | 1/2017 |
| CN | 106462765 | A | 2/2017 |
| CN | 106873063 | A | 6/2017 |
| TW | 105122567 | * | 7/2016 |

OTHER PUBLICATIONS

English translation of ISR for PCT/CN2017/104042 dated Jan. 1, 2018.
English translation of Chinese Office Action for CN 2017100999599 dated Mar. 5, 2018.

* cited by examiner

TOUCH DEVICE AND DISPLAY DEVICE

CROSS-REFERENCE TO RELATED APPLICATIONS

This application is a continuation-in-part of International Application No. PCT/CN2017/101699, filed on Sep. 14, 2017, which claims priority of Chinese Patent Application No. 201710099959.9, filed Feb. 23, 2017, both of which are hereby incorporated by reference in their entireties.

FIELD

The present disclosure relates to the field of display technologies, and particularly to a touch device and a display device.

BACKGROUND

At present, a fingerprint recognition component installed in a display device, e.g., a mobile phone, etc., is typically located in a Home button area, on the backside of the display device, or in another non-display area of the display device, and a future display device to be developed will have a very small thickness, a wide color gamut, and a wide angle of view, and be integrated with various sensing functions.

SUMMARY

An embodiment of the disclosure provides a touch device including: a protecting cover, an array substrate arranged below the protecting cover, a plurality of sensing elements arranged on the array substrate to recognize a fingerprint, and a plurality of filter structures arranged between the protecting cover and the plurality of sensing elements, wherein: each of the plurality of filter structures comprises a plurality of filter layers arranged in a stack, each of the plurality of filter layers comprises light-transmitting areas and light-shielding areas on a periphery of the light-transmitting areas, orthographic projections of any two of the light-transmitting areas of the plurality of filter layers onto the array substrate have an overlapping area; the overlapping area is smaller than an area of an orthographic projection of any one of the light-transmitting areas of the plurality of filter layers onto the array substrate.

In a possible implementation, in the touch device above according to the embodiment of the disclosure, an orthographic projection of at least one of the plurality of sensing elements onto the array substrate overlaps an orthographic projection of a light-transmitting area of one of the plurality of filter structures onto the display panel.

In a possible implementation, in the touch device above according to the embodiment of the disclosure, the centers of the light-transmitting areas of every two adjacent filter layers in the plurality of filter structures are displaced from each other.

In a possible implementation, in the touch device above according to the embodiment of the disclosure, the orthographic projections of the light-transmitting areas of every two adjacent filter layers in the plurality of filter structures onto the display panel only partially overlap with each other.

In a possible implementation, in the touch device above according to the embodiment of the disclosure, a transparent material is filled in the light-transmitting areas of at least a part of the plurality of filter layers.

In a possible implementation, in the touch device above according to the embodiment of the disclosure, the transparent material is a transparent electrically-conductive oxide material or a transparent organic material.

In a possible implementation, in the touch device above according to the embodiment of the disclosure, one of outermost light-transmitting areas of the plurality of filter structures are hollow areas.

In a possible implementation, in the touch device above according to the embodiment of the disclosure, materials of the light-shielding areas are an opaque or semitransparent material.

In a possible implementation, in the touch device above according to the embodiment of the disclosure, the materials of the light-shielding areas are a metal material or a dark resin material.

In a possible implementation, in the touch device above according to the embodiment of the disclosure, a ratio of a depth to a width of an opening of the overlapping areas among the plurality of filter layers in the plurality of filter structures is approximately 6:1, and the depth ranges from 1 to 100 μm.

In a possible implementation, in the touch device above according to the embodiment of the disclosure, the plurality of filter layers in the plurality of filter structures contact with each other.

In a possible implementation, in the touch device above according to the embodiment of the disclosure, shapes of a section in a planer parallel to the array substrate, of the light-transmitting areas of one of the plurality of filter layers are any one or combination of a round, a triangle, a rectangle, a diamond, and a polygon.

An embodiment of the disclosure provides a display device including: a display panel comprising a plurality of pixel elements, a protecting cover arranged on a light exit side of the display panel, a plurality of sensing elements arranged below the protecting cover to recognize a fingerprint, and a plurality of filter structures arranged between the protecting cover and the plurality of sensing elements, wherein orthographic projections of the plurality of sensing elements onto the display panel do not overlap with orthographic projections of the plurality of pixel elements onto the display panel; and each of the plurality of filter structures comprises a plurality of filter layers arranged in a stack, each of the plurality of filter layers comprises a first light-transmitting area, a second light-transmitting area and a light-shielding area on a periphery of the first and second light-transmitting areas, orthographic projections of any two of the first light-transmitting areas of the plurality of filter layers onto the display panel have an overlapping area; the overlapping area is smaller than an area of an orthographic projection of any one of the first light-transmitting areas of the plurality of filter layers onto the display panel.

In a possible implementation, in the display device above according to the embodiment of the disclosure, an orthographic projection of at least one of the plurality of sensing elements onto the display panel overlaps an orthographic projection of a first light-transmitting area of one of the plurality of filter structures onto the display panel; an orthographic projection of at least one of the plurality of pixel elements onto the display panel overlaps an orthographic projection of a second light-transmitting area of one of the plurality of filter structures onto the display panel.

In a possible implementation, in the display device above according to the embodiment of the disclosure, the centers of the first light-transmitting areas of every two adjacent filter layers in the plurality of filter structures are displaced from each other.

In a possible implementation, in the display device above according to the embodiment of the disclosure, the orthographic projections of the first light-transmitting areas of every two adjacent filter layers in the plurality of filter structures onto the display panel only partially overlap with each other.

In a possible implementation, in the display device above according to the embodiment of the disclosure, a transparent material is filled in the first light-transmitting areas of at least a part of the plurality of filter layers; the transparent material is a transparent electrically-conductive oxide material or a transparent organic material.

In a possible implementation, in the display device above according to the embodiment of the disclosure, one of outermost light-transmitting areas of the plurality of filter structures is a hollow area.

In a possible implementation, in the display device above according to the embodiment of the disclosure, materials of the light-shielding areas are an opaque or semitransparent material; a ratio of a depth to a width of an opening of the overlapping areas among the plurality of filter layers in the plurality of filter structures is approximately 6:1, and the depth ranges from 1 to 100 μm; the plurality of filter layers in the plurality of filter structures contact with each other; shapes of a section in a planer parallel to the display panel, of the first light-transmitting areas of one of the plurality of filter layers are any one or combination of a round, a triangle, a rectangle, a diamond, and a polygon.

In a possible implementation, in the display device above according to the embodiment of the disclosure, the plurality of sensing elements are arranged on sides of the pixel elements away from the light exit side, or the plurality of sensing elements are arranged on light exit face sides of the plurality of pixel elements, and located inside the display panel, or the plurality of sensing elements are arranged between the display panel and the protecting cover.

DETAILED DESCRIPTION OF THE EMBODIMENTS

Figure 1:
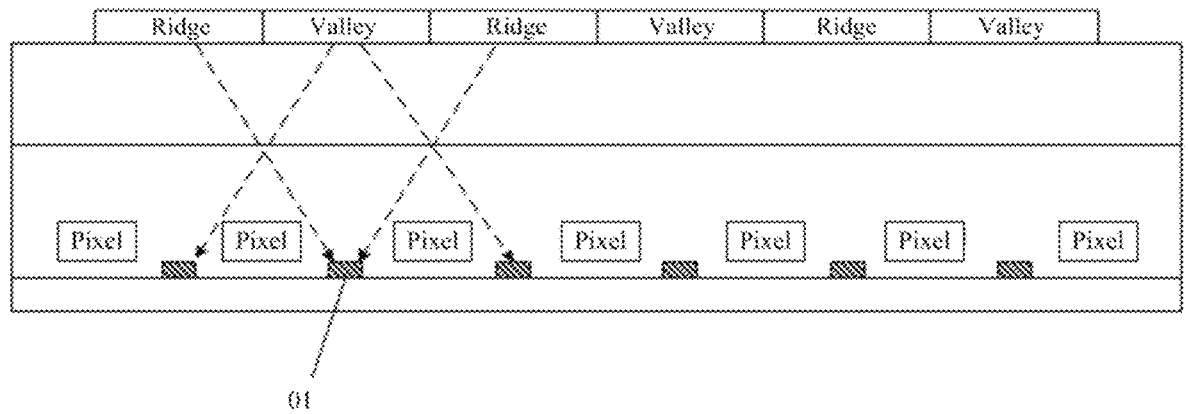
FIG. 1 is a schematic structural diagram of the touch device in the related art.

When optical sensors for recognizing a fingerprint, i.e., sensors, are integrated in the display panel, there is a longer distance between the sensor, and the contact face of a finger, so that light reflected from the finger arrives at the sensors over a longer distance, so the light rays reflected from the finger may be scattered before they arrive at the sensors. As illustrated in FIG. 1, a single optical sensor 01 receives fingerprint information of a plurality of valleys and ridges, thus resulting in a burred optical fingerprint pattern, and consequently degrading the precision of fingerprint recognition.

Figure 2:
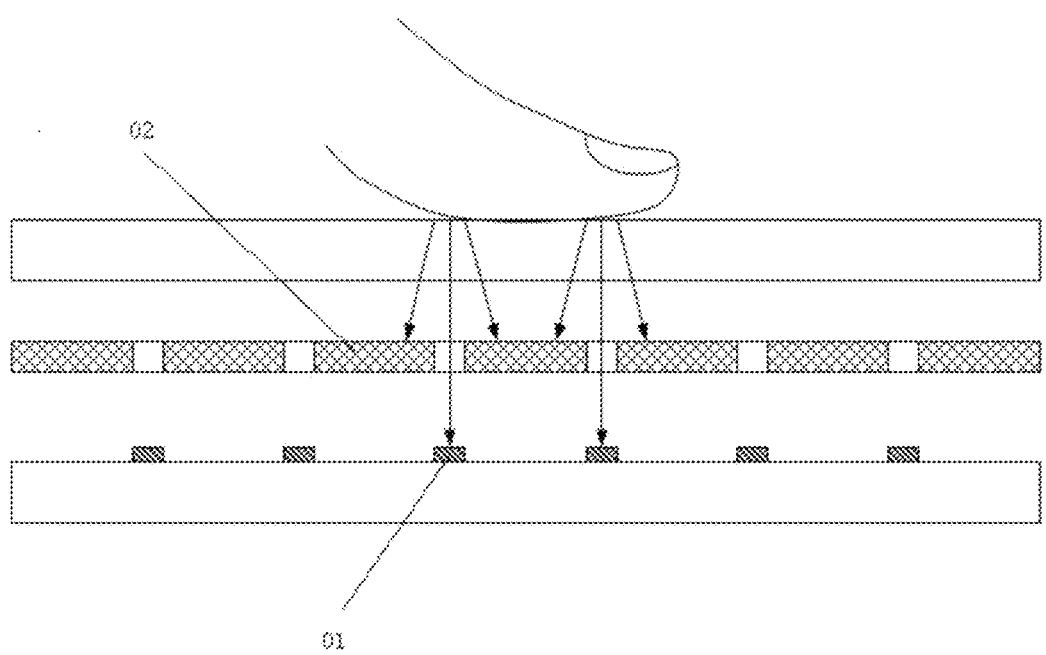
FIG. 2 is a schematic structural diagram of the touch device including the filter structures.

In order to address the problem above, as illustrated in FIG. 2, filter structures 02 can be added between the sensor, and the contact face of the finger to collimate the light reflected from the finger in optical fingerprint recognition to filter out interfering reflected light, so that the reflected light passing the filter structures is almost incident onto the sensors 01 perpendicularly thereto. Optionally the filter structures include light-shielding areas and light-transmitting areas, where the light-transmitting areas can be holes, grooves, or a light-transmitting material. For example, the light-transmitting areas are holes with an aspect ratio (the ratio of the depth to the width of a hole) which shall be a specific value for high-performance collimation, where the aspect ratio of a hole is arranged from 1:100 to 100:1, and is optionally approximately 6:1. Optionally, the depth of a hole optionally ranges from 1 to 100 μm in a case of that the aspect ratio of a hole is approximately 6:1. The diameter of a hole is at least 3 μm, for example, due to the precision of a fabrication process, so the depth of a hole shall be 18 μm for collimation, but the thickness of a display panel may be affected due to too large thicknesses of the filter structures. Furthermore the diameter of a hole may need to be made smaller in reality to thereby improve the precision of optical fingerprint recognition. An embodiment of the disclosure provides a touch device so as to address the problem in the related art of failing to fabricate smaller light-transmitting areas in the filter structures due to the limited process precision.

Implementations of a touch device according to an embodiment of the disclosure will be described below in details with reference to the drawings.

The thicknesses of respective components, and the shapes and sizes of respective areas in the drawings will not reflect any real proportion of a touch device, but are only intended to illustrate the disclosure of by way of an example.

Figure 3:
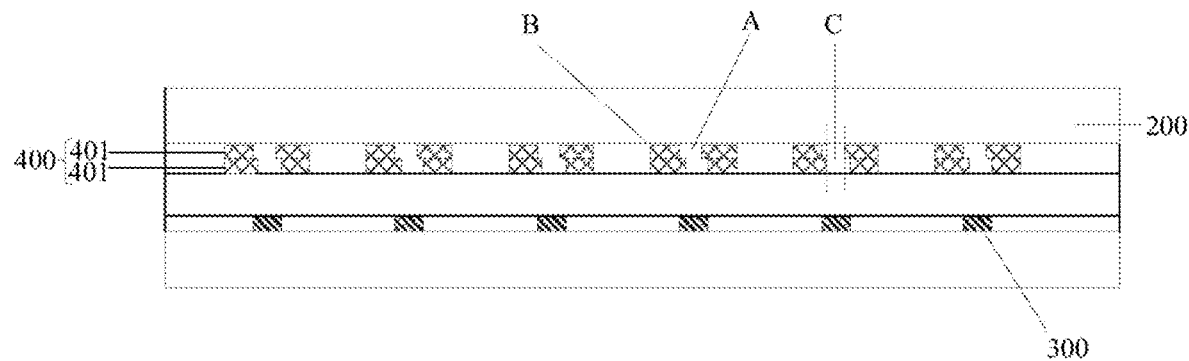
FIG. 3 is a schematic structural diagram of a touch device according to an embodiment of the disclosure.

An embodiment of the disclosure provides a touch device as illustrated in FIG. 3, where the touch device includes: a protecting cover 200, an array substrate arranged below the protecting cover 200, a plurality of sensing elements 300 arranged on the array substrate to recognize a fingerprint, and a plurality of filter structures 400 arranged between the protecting cover 200 and the plurality of sensing elements 300.

Each of the filter structures 400 includes a plurality of filter layers 401 arranged in a stack, each filter layer 401 includes a light-transmitting area A, and a light-shielding area B on a periphery of the light-transmitting area A, the centers of the light-transmitting areas A of the respective filter layers 401 at least partially overlap with each other, and orthographic projections of the light-transmitting areas A of the respective filter layers 401 onto the display panel have overlapping areas C which are smaller than the light-transmitting areas A of the respective filter layers 401.

It shall be noted that in the touch device above according to the embodiment of the disclosure, the number of filter layers 401 in a filter structure 400 can be set as needed in reality, and for example, can be two, three, or more layers, although the embodiment of the disclosure will not be limited thereto.

Optionally in the touch device above according to the embodiment of the disclosure, the filter structures 400 arranged between the protecting cover 200 and the plurality of sensing elements 300 are changed to include the plurality of filter layers 401 arranged in a stack, where the filter structures 400 collimate light reflected from a finger in optical fingerprint recognition to filter out interfering reflected light. The centers of the light-transmitting areas A of the respective filter layers 401 are at least partially displaced from each other, so that the orthographic projections of the light-transmitting areas A of the respective filter layers 401 onto the display panel have the overlapping areas C which are smaller than the light-transmitting areas A of the respective filter layers 401, where the overlapping areas C are light-transmitting areas of the filter structures 400. An amount of displacement of the centers of the light-transmitting areas A of the respective filter layers 401 from each other can be adjusted to thereby narrow the light-transmitting areas of the filter structures 400 as needed so as to avoid the filter structures 400 from being affected by the precision of a fabrication process, thus improving the precision of optical fingerprint recognition. Furthermore the light-transmitting areas of the filter structures 400 can be narrowed as needed to thereby avoid the thickness of the touch device from being affected due to too large thicknesses of the filter structures 400 while guaranteeing the collimation function thereof.

In an optional implementation, each filter structure 400 can be arranged corresponding to at least one of the sensing elements 300, and as illustrated in FIG. 3, for example, each filter structure 400 can correspond to one of the sensing elements 300. Of course, each filter structure 400 can alternatively correspond to a plurality of the sensing elements 300, although the embodiment of the disclosure will not be limited thereto.

Figure 5A:
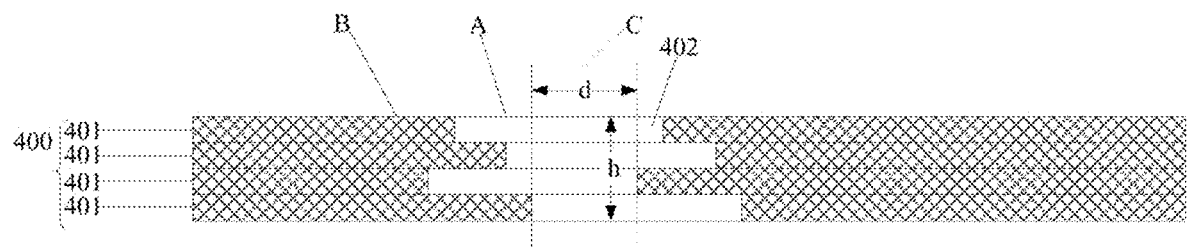
FIG. 5A to FIG. 5D are schematic structural diagrams respectively of a filter structure in the touch device and the display device according to the embodiment of the disclosure.

In an optional implementation, in the touch device above according to the embodiment of the disclosure, in order to enable the filter structures 400 to collimate the light reflected from the finger in optical fingerprint recognition to filter out interfering reflected light, an aspect ratio (the ratio of the depth to the width of a hole) of the overlapping areas C among the respective filter layers 401 in the filter structures 400 as illustrated in FIG. 5A is arranged from 1:100 to 100:1, and is optionally approximately 6:1. Optionally, the depth of a hole optionally ranges from 1 to 100 μm in a case of that the aspect ratio of a hole is approximately 6:1.

Furthermore in an optional implementation, in the touch device above according to the embodiment of the disclosure, in order to facilitate the fabrication of the filter structures, and to perform their good collimation function, the respective filter layers 401 in the filter structures 400 typically contact with each other, that is, there is typically not any other layer arranged between two adjacent filter layers 401, as illustrated in FIG. 5A to FIG. 5D.

In an optional implementation, in the touch device above according to the embodiment of the disclosure, in order to enable the orthographic projections of the light-transmitting areas A of the respective filter layers 401 onto the display panel to have the smaller overlapping areas C than the respective light-transmitting areas A, typically the centers of the light-transmitting areas A of every two adjacent filter layers 401 in the filter structures 400 are displaced from each other as illustrated in FIG. 5A to FIG. 5D. Furthermore it shall be noted that in the touch device above according to the embodiment of the disclosure, the centers of the light-transmitting areas A of two filter layers 401 spaced from each other may overlap with each other, although the embodiment of the disclosure will not be limited thereto.

Furthermore in an optional implementation, in the touch device above according to the embodiment of the disclosure, in order to enable the orthographic projections of the light-transmitting areas A of the respective filter layers 401 onto the display panel to have the smaller overlapping areas C than the respective light-transmitting areas A, typically the orthographic projections of the light-transmitting areas A of every two adjacent filter layers 401 in the filter structures 400 onto the display panel only partially overlap with each other as illustrated in FIG. 5A to FIG. 5D, so that the light-transmitting areas A of every two adjacent filter layers 401 have a smaller overlapping area than one of the light-transmitting areas A.

Figure 5B:
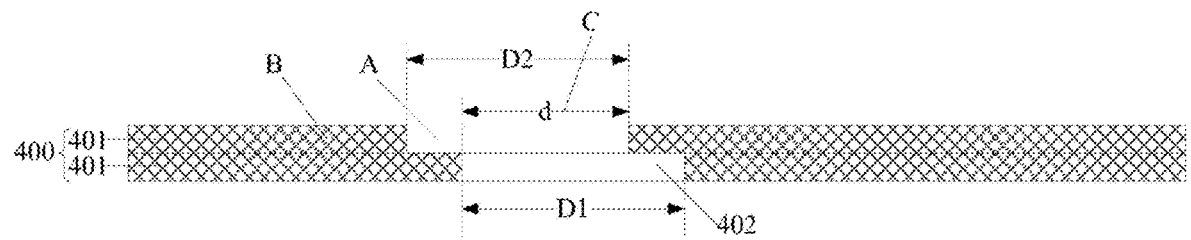
Figure 5C:
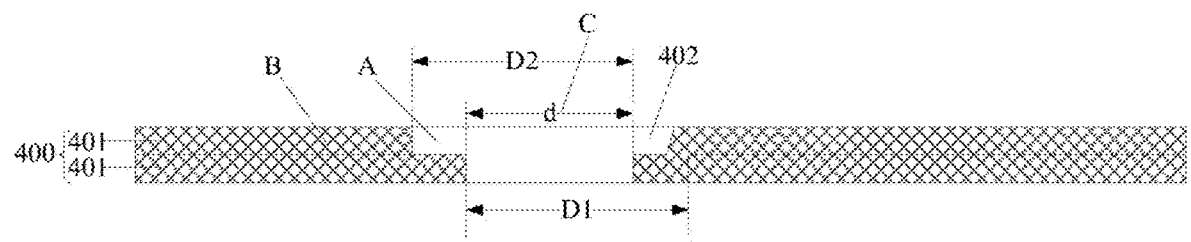

In an optional implementation, in the touch device above according to the embodiment of the disclosure, in order to enable the surfaces of the filter structures 400 to be relatively planar to thereby facilitate the arrangement of another layer above the filter structures 400, a transparent material 402 can be filled in the light-transmitting areas A of at least a part of the filter layers 401 as illustrated in FIG. 5A to FIG. 5C.

As illustrated in FIG. 5A, for example, there is a filter structure 400 including four filter layers 401, a transparent material 402 can be filled in all the light-transmitting areas A of the four filter layers 401, and upper surfaces of respective layers of the transparent material 402 are flush with upper surfaces of their corresponding filter layers 401, that is, the respective layers of the transparent material 402 have the same thicknesses as those of their corresponding filter layers 401. Optionally firstly the respectively layers of the transparent material 402, and then their corresponding filter layers 401 can be fabricated; or firstly the filter layers 401, and then their corresponding layers of the transparent material 402 can be fabricated, although the embodiment of the disclosure will not be limited thereto. Furthermore the respective filter layers 401, and their corresponding layers of the transparent material 402 may or may not be fabricated in the same order, although the embodiment of the disclosure will not be limited thereto.

In another example, as illustrated in FIG. 5B and FIG. 5C, there is a filter structure 400 including two filter layers 401, and a transparent material 402 can be filled in the light-transmitting area A of either of the filter layers 401. As illustrated in FIG. 5B, for example, the transparent material 402 can be filled in the light-transmitting area A of the lower filter layer 401, and an upper surface of that layer of the transparent material 402 is flush with an upper surface of the lower filter layer 401, that is, the layer of the transparent material 402 has the same thickness as that of the lower filter layer 401. Optionally firstly the layer of the transparent material 402, and then the corresponding filter layer 401 can be fabricated; or firstly the filter layer 401, and then the corresponding layer of the transparent material 402 can be fabricated, although the embodiment of the disclosure will not be limited thereto. In another example, as illustrated in FIG. 5C, the transparent material 402 can be filled in the light-transmitting area A of the upper filter layer 401, and an upper surface of that layer of the transparent material 402 is flush with an upper surface of the upper filter layer 401, that is, the layer of the transparent material 402 has the same thickness as the total thickness of the two filter layers 401. Optionally firstly the filter layer 401, and then the corresponding layer of the transparent material 402 need to be fabricated.

In an optional implementation, in the touch device above according to the embodiment of the disclosure, the transparent material 402 can optionally be a transparent electrically-conductive oxide material or a transparent organic material. In a case that the transparent material 402 is the transparent electrically-conductive oxide material, the layer of the transparent material 402 can be fabricated integrally with some electrode structures so as to simplify a manufacturing process for the touch device, and is especially advantageous when the filter layer of conductive function is considered.

Figure 5D:
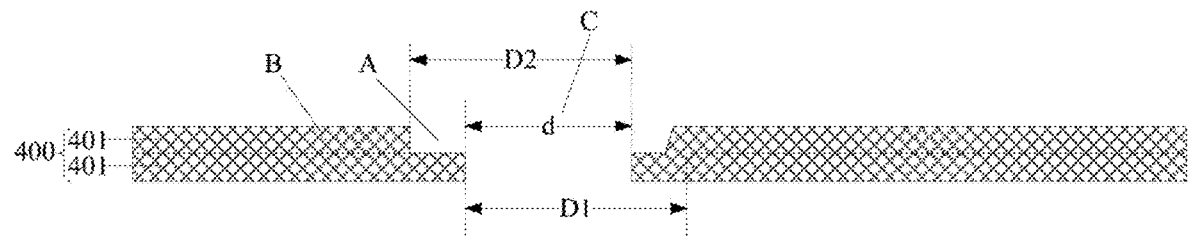
Figure 6:
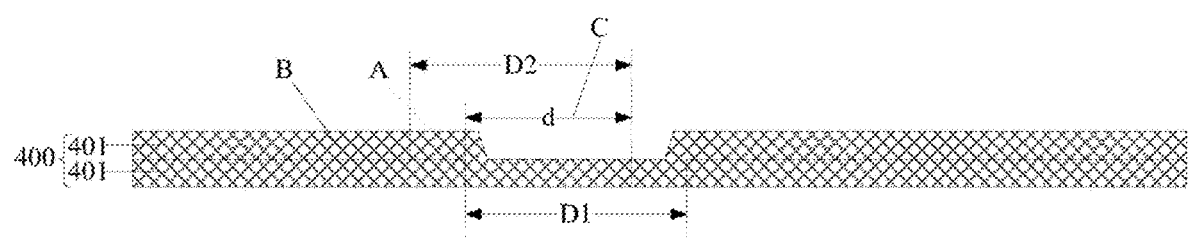
FIG. 6 is a schematic structural diagram of the filter structure being fabricated in the touch device and the display device according to the embodiment of the disclosure.

Alternatively in an optional implementation, in the touch device above according to the embodiment of the disclosure, in order to simplify a fabrication process of the filter structures 400, a light-transmitting area A of one of the outermost filter layer in the filter structures 400 can be arranged as a hollow area, that is, the light-transmitting area A of one of the outermost filter layer in the filter structures 400 is a through-hole, as illustrated in FIG. 5B and FIG. 5D. In an optional implementation, the outermost filter layer in the filter structures 400 is determined based on whether a substrate layer on which the filter structures 400 are arranged, is the protecting cover or the array substrate. As illustrated in FIG. 5D, for example, there is a filter structure 400 including two filter layers 401, and the light-transmitting areas A of both of the two filter layers 401 are hollow areas. Optionally the lower filter layer 401 can be firstly fabricated, and then subjected to a photolithography process, and etched, thus forming a through-hole, i.e., a hollow area, with a diameter of D1. In a general design and a general process, the smallest diameter of the hole is constrained by the limited precision of an exposure machine, and an etching process, and for example, the diameter thereof can only be made 3 μm. Thereafter as illustrated in FIG. 6, the upper filter layer 401 is fabricated further to the lower filter layer 401, and then subjected to a photolithography process, and etched, thus forming a through-hole, with a diameter of D2. Centers of the two filter layers 401 can be controlled to be displaced from each other to thereby control the diameter d of an overlapping area C between them.

In an optional implementation, in the touch device above according to the embodiment of the disclosure, the materials of the light-shielding areas B are an opaque or semitransparent material. Optionally when the sensing elements 300 are visible photosensitive sensors, the materials of the light-shielding areas B are typically an opaque material, and in order not to affect normal displaying, typically the light emitted from the pixel elements 100 is not shielded. When the sensing elements 300 are infrared photosensitive sensors, the materials of the filter layers 401 are typically a semitransparent material to absorb corresponding infrared light, e.g., an organic material or an inorganic material, although the embodiment of the disclosure will not be limited thereto.

Optionally in the touch device above according to the embodiment of the disclosure, the materials of the light-shielding areas B can optionally be a metal material, e.g., copper (Cu), or a dark resin material. Furthermore the materials of the respective light-shielding areas B may or may not the same, although the embodiment of the disclosure will not be limited thereto.

Figure 7A:
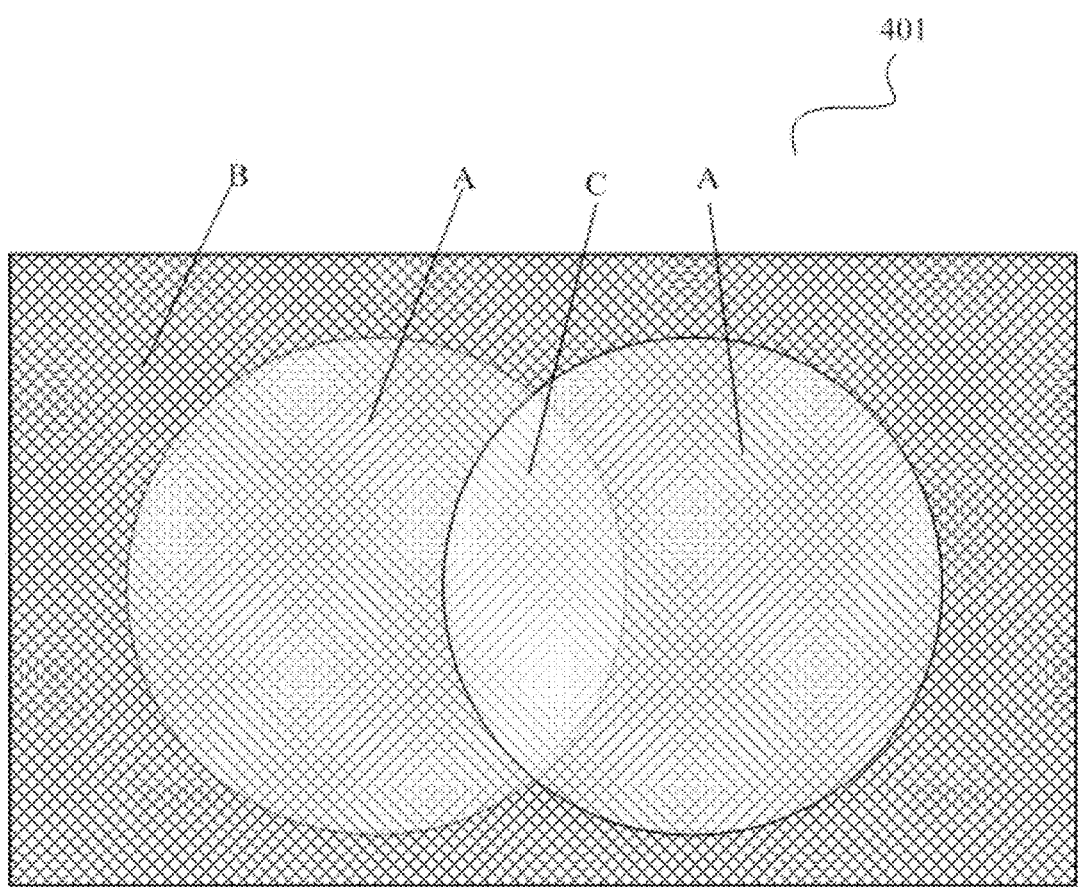
FIG. 7A to FIG. 7E are schematic structural diagrams respectively of contours of light-transmitting areas of respective filter layers in the filter structures in the touch device and the display device according to the embodiment of the disclosure.
Figure 7B:
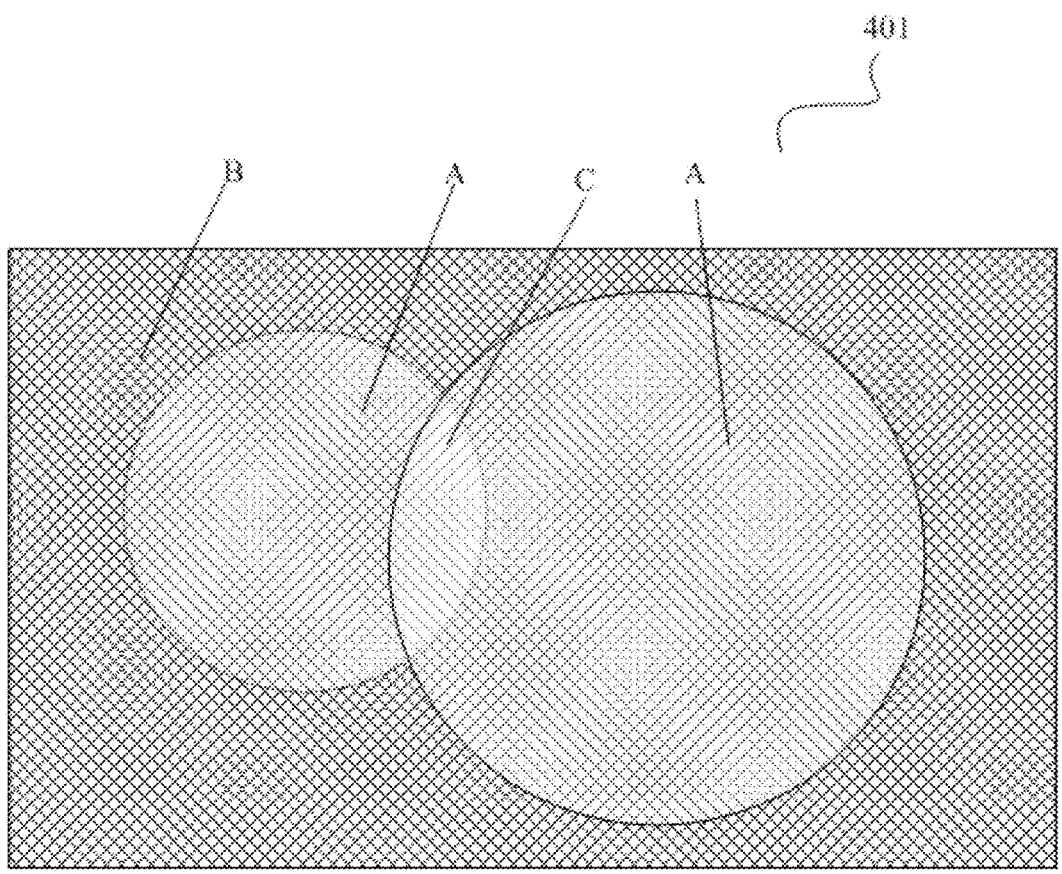
Figure 7C:
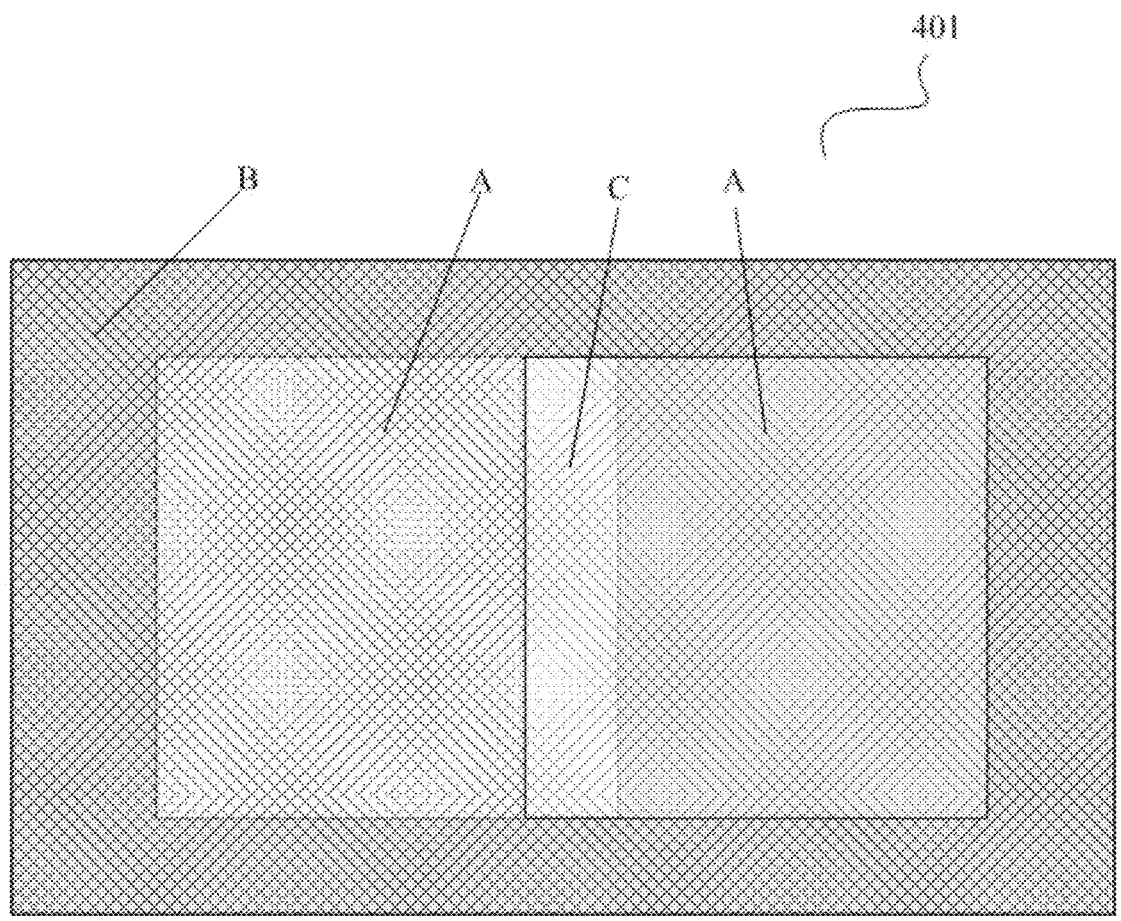
Figure 7D:
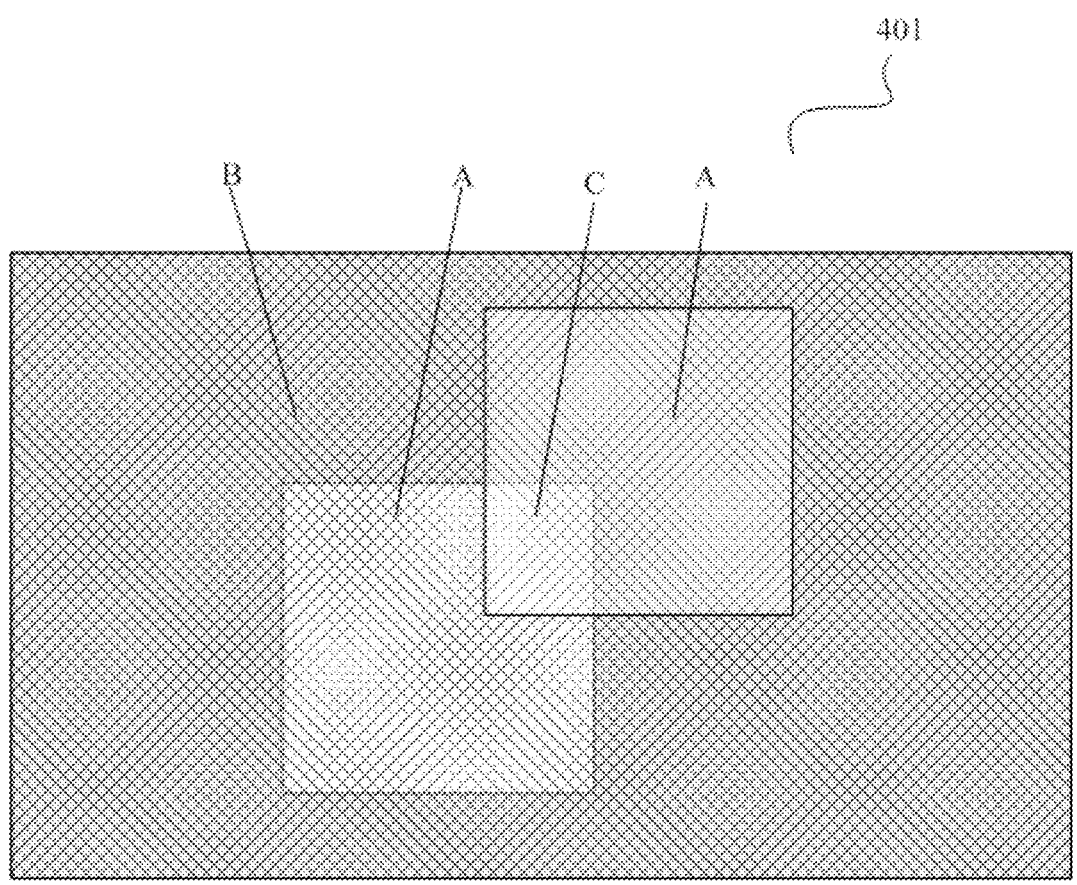
Figure 7E:
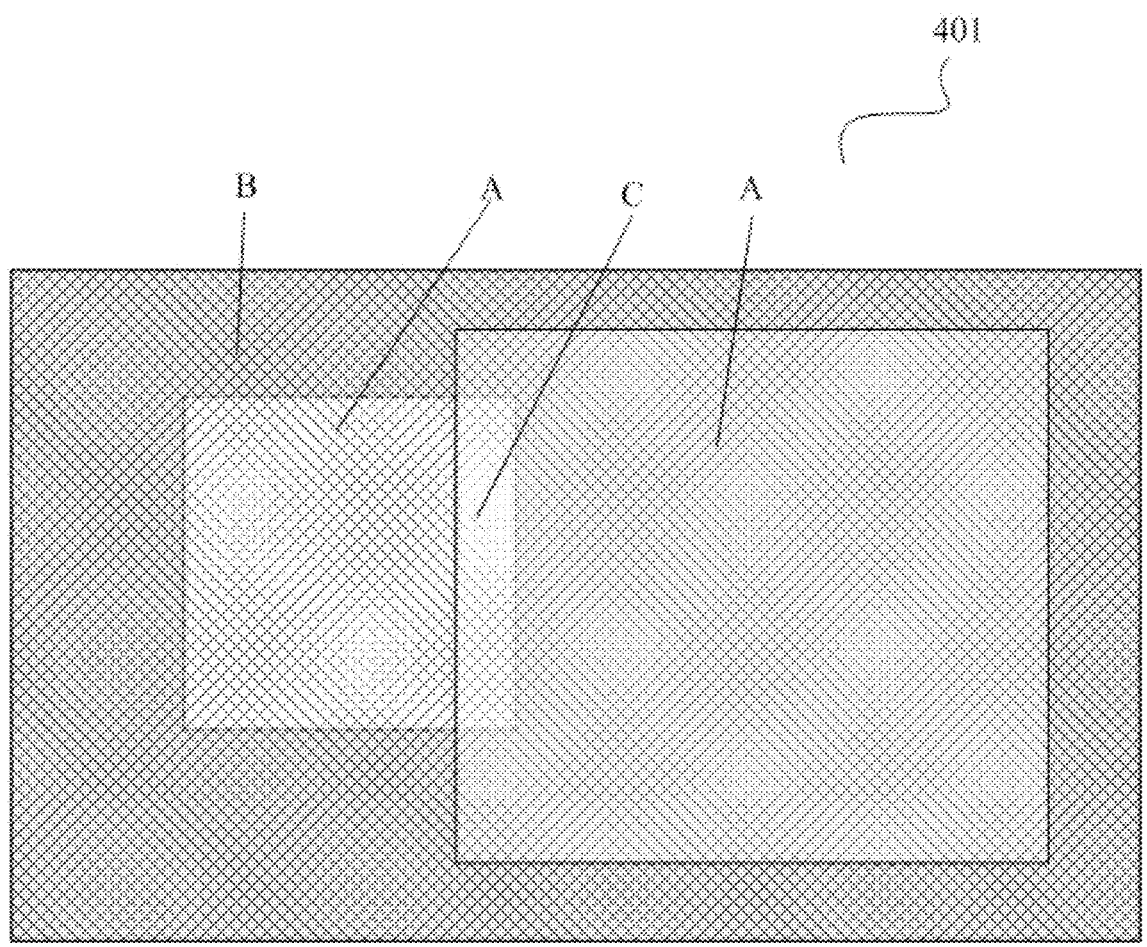

In an optional implementation, in the touch device above according to the embodiment of the disclosure, the sizes and the shapes of the light-transmitting areas A of the respective filter layers 401 may or may not be the same as illustrated in FIG. 7A or FIG. 7E, and for example, the shapes of a section in a planer parallel to the array substrate of the light-transmitting areas A of the respective filter layers 401 may be any one or combination of a round and a triangle as illustrated in FIG. 7A and FIG. 7B, and a rectangle, a diamond, and a polygon as illustrated in FIG. 7C to FIG. 7E, although the embodiment of the disclosure will not be limited thereto.

Figure 4A:
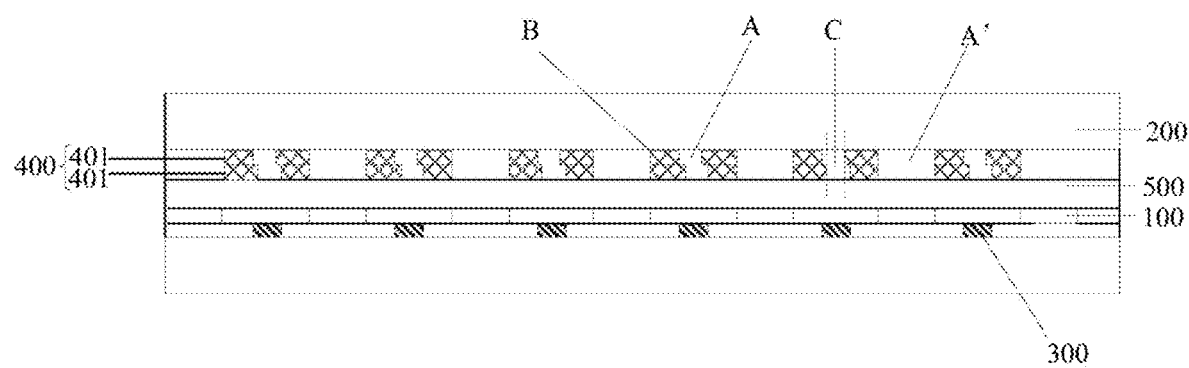
FIG. 4A to FIG. 4C are schematic structural diagrams respectively of a display device according to an embodiment of the disclosure.
Figure 4B:
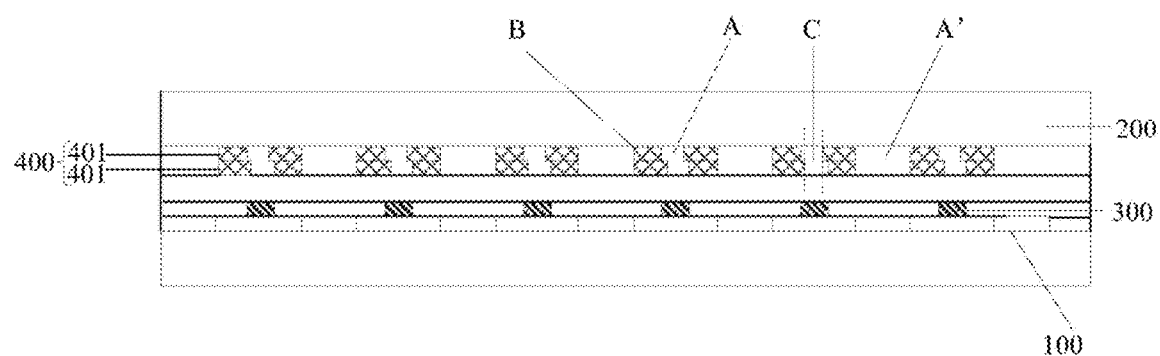
Figure 4C:
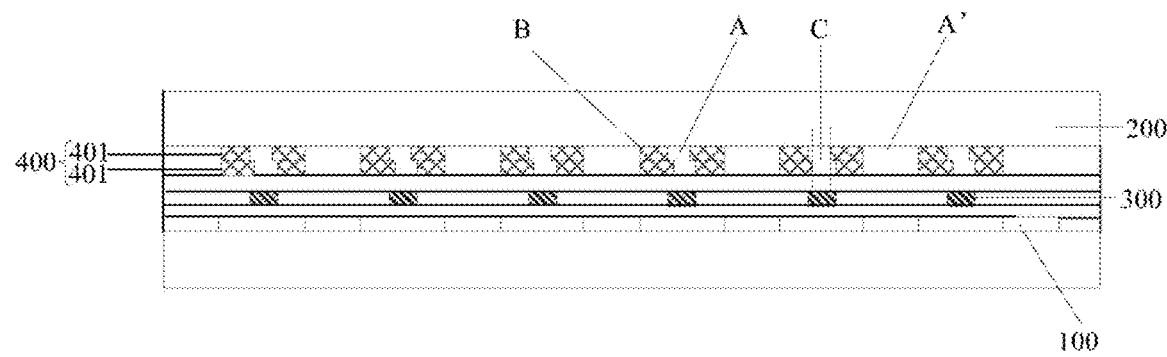

Further, an embodiment of the disclosure provides a display device as illustrated in FIG. 4A to FIG. 4C, where the display device includes the touch device described above. A repeated description thereof will be omitted here.

The display device further includes: a display panel including a plurality of pixel elements 100. Optionally the protecting cover 200 is arranged on a light exit side of the display panel.

The orthographic projections of the plurality of sensing elements 300 onto the display panel do not overlap with orthographic projections of the plurality of pixel elements 100 onto the display panel.

Optionally, each of the plurality of filter layers includes a first light-transmitting area (corresponding to light-transmitting area A. A repeated description thereof will be omitted here), a second light-transmitting area A' and a light-shielding area on a periphery of the first and second light-transmitting areas, centers of first light-transmitting areas of the plurality of filter layers at least partially overlap with each other, and orthographic projections of the first light-transmitting areas of the plurality of filter layers onto the display panel have overlapping areas which are smaller than the first light-transmitting areas of the plurality of filter layers.

In an optional implementation, in the display device above according to the embodiment of the disclosure, in order to improve the portability of, and to lower the cost of, the display device, the sensing elements 300 can be integrated in a display area of the display panel, and at this time, the sensing elements 300 and the filter structures 400 are typically arranged in a non-light-emitting area in the display area of the display panel, i.e., at the gaps between the pixel elements 100 as illustrated in FIG. 4A to FIG. 4C.

In an optional implementation, an orthographic projection of at least one of the plurality of sensing elements 300 onto the display panel overlaps an orthographic projection of a first light-transmitting area of one of the plurality of filter structures onto the display panel; an orthographic projection of at least one of the plurality of pixel elements 100 onto the display panel overlaps an orthographic projection of a second light-transmitting area A' of one of the plurality of filter structures onto the display panel.

Furthermore in an optional implementation, in the display device above according to the embodiment of the disclosure, a relative layer-level positional relationship between the sensing elements 300 and the pixel elements 100 will not be limited to any relative layer-level positional relationship, and for example, as illustrated in FIG. 4A, the sensing elements 300 can be arranged on the sides of the pixel elements 100 away from the light exit side; or as illustrated in FIG. 4B, the sensing elements 300 can be arranged on the light exit face sides of the pixel elements 100, and located inside the display panel; or as illustrated in FIG. 4C, the sensing elements 300 can be arranged between the display panel and the protecting cover 200.

In an optional implementation, a functional film 500 may be arranged between the filter layer 401 and the pixel elements 100. The functional film 500 will not be limited to any particular film, and can be a passivation film, etc., for example.

In an optional implementation, the touch device above according to the embodiment of the disclosure can be a mobile phone, a tablet computer, a TV set, a monitor, a notebook computer, a digital photo frame, a navigator, or any other product or component capable of displaying, although the embodiment of the disclosure will not be limited thereto.

In the touch device and the display device above according to the embodiment of the disclosure, the filter structures arranged between the protecting cover and the plurality of sensing elements are changed to each include the plurality of filter layers arranged in a stack, where the filter structures collimate light reflected from a finger in optical fingerprint recognition to filter out interfering reflected light. Each filter layer includes the light-transmitting area, and the light-shielding area on a periphery of the light-transmitting area, and the centers of the light-transmitting areas of the respective filter layers are at least partially displaced from each other, so that the orthographic projections of the light-transmitting areas of the respective filter layers onto the display panel have the smaller overlapping areas than the light-transmitting areas of the filter layers, where the overlapping areas are light-transmitting areas of the filter structures. An amount of displacement of the centers of the light-transmitting areas of the respective filter layers from each other can be adjusted to thereby narrow the light-transmitting areas of the filter structures as needed so as to avoid the filter structures from being affected by the precision of a fabrication process, thus improving the precision of optical fingerprint recognition. Furthermore the light-transmitting areas of the filter structures can be narrowed as needed to thereby avoid the thickness of the display device from being affected due to too large thicknesses of the filter structures while guaranteeing the collimation function thereof.

Evidently those skilled in the art can make various modifications and variations to this disclosure without departing from the spirit and scope of this disclosure. Thus this disclosure is also intended to encompass these modifications and variations thereto so long as the modifications and variations come into the scope of the claims appended to this disclosure and their equivalents.

The invention claimed is:

1. A touch device, comprising: an array substrate, a plurality of sensing elements arranged on the array substrate to recognize a fingerprint, and a plurality of filter structures arranged on a side of the plurality of sensing elements; the side is away from the array substrate, wherein:
   each of the plurality of filter structures comprises a plurality of filter layers arranged in a stack, each of the plurality of filter layers comprises light-transmitting areas and light-shielding areas on a periphery of the light-transmitting areas, orthographic projections of any two of the light-transmitting areas of the plurality of filter layers onto the array substrate have an overlapping area; the overlapping area is smaller than an area of an orthographic projection of each of the light-transmitting areas of the plurality of filter layers onto the array substrate.

2. The touch device according to claim 1, wherein an orthographic projection of each of the plurality of sensing elements onto the array substrate overlaps an orthographic projection of a light-transmitting area of one of the plurality of filter structures onto the array substrate.

3. The touch device according to claim 1, wherein central positions of the light-transmitting areas of every two adjacent filter layers in the plurality of filter structures are displaced from each other.

4. The touch device according to claim 1, wherein orthographic projections of the light-transmitting areas of every two adjacent filter layers in the plurality of filter structures onto the array substrate only partially overlap with each other.

5. The touch device according to claim 1, wherein a transparent material is filled in the light-transmitting areas of at least one of the plurality of filter layers.

6. The touch device according to claim 5, wherein the transparent material is a transparent electrically-conductive oxide material or a transparent organic material.

7. The touch device according to claim 1, wherein a light-transmitting area of one of outermost filter layer in the plurality of filter structures is a hollow area.

8. The touch device according to claim 1, wherein materials of the light-shielding areas are an opaque or semitransparent material.

9. The touch device according to claim 8, wherein the materials of the light-shielding areas are a metal material or a dark resin material.

10. The touch device according to claim 1, wherein a ratio of a depth to a width of an opening of the overlapping areas among the plurality of filter layers in the plurality of filter structures is approximately 6:1, and the depth ranges from 1 to 100 µm.

11. The touch device according to claim 1, wherein the plurality of filter layers in the plurality of filter structures contact with each other.

12. The touch device according to claim 1, wherein shapes of a section in a planer parallel to the array substrate of the light-transmitting areas of one of the plurality of filter layers are any one or combination of a round, a triangle, a rectangle, a diamond, and a polygon.

13. A display device comprising: a display panel comprising a plurality of pixel elements, a plurality of sensing elements arranged on a light exit side of the display panel to recognize a fingerprint, and a plurality of filter structures arranged on a side of the plurality of sensing elements; the side is away from the array substrate, wherein:
   orthographic projections of the plurality of sensing elements onto the display panel do not overlap with orthographic projections of the plurality of pixel elements onto the display panel; and
   each of the plurality of filter structures comprises a plurality of filter layers arranged in a stack, each of the plurality of filter layers comprises a first light-transmitting area, a second light-transmitting area and a light-shielding area on a periphery of the first light-transmitting areas and the second light-transmitting areas, orthographic projections of any two of the first light-transmitting areas of the plurality of filter layers onto the display panel have an overlapping area; the overlapping area is smaller than an area of an orthographic projection of each of the first light-transmitting areas of the plurality of filter layers onto the display panel.

14. The display device according to claim 13, wherein an orthographic projection of at least one of the plurality of sensing elements onto the display panel overlaps an orthographic projection of a first light-transmitting area of one of the plurality of filter structures onto the display panel; an orthographic projection of at least one of the plurality of pixel elements onto the display panel overlaps an orthographic projection of a second light-transmitting area of one of the plurality of filter structures onto the display panel.

15. The display device according to claim 13, wherein central positions of the first light-transmitting areas of every two adjacent filter layers in the plurality of filter structures are displaced from each other.

16. The display device according to claim 15, wherein orthographic projections of the first light-transmitting areas of every two adjacent filter layers in the plurality of filter structures onto the display panel only partially overlap with each other.

17. The display device according to claim 13, wherein a transparent material is filled in the first light-transmitting areas of at least a part of the plurality of filter layers; the transparent material is a transparent electrically-conductive oxide material or a transparent organic material.

18. The display device according to claim 13, wherein a light-transmitting area of one of outermost filter layer in the plurality of filter structures is a hollow area.

19. The display device according to claim 13, wherein materials of the light-shielding areas are an opaque or semitransparent material; a ratio of a depth to a width of an opening of the overlapping areas among the plurality of filter layers in the plurality of filter structures is approximately 6:1, and the depth ranges from 1 to 100 µm; the plurality of filter layers in the plurality of filter structures contact with each other; shapes of a section in a planer parallel to the display panel, of the first light-transmitting areas of one of the plurality of filter layers are any one or combination of a round, a triangle, a rectangle, a diamond, and a polygon.

20. The display device according to claim 13 wherein the plurality of sensing elements are arranged on sides of the pixel elements away from the light exit side, or the plurality of sensing elements are arranged on light exit face sides of the plurality of pixel elements, and located inside the display panel, or the plurality of sensing elements are arranged between the display panel and the protecting cover.

* * * * *